United States Patent
Schwesinger et al.

(10) Patent No.: US 11,787,277 B2
(45) Date of Patent: Oct. 17, 2023

(54) DRIVE AND METHOD FOR OPERATING A DRIVE

(71) Applicant: SEW-EURODRIVE GMBH & CO. KG, Bruchsal (DE)

(72) Inventors: Klaus Schwesinger, Bruchsal (DE); Matthias Schneider, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 27 days.

(21) Appl. No.: 17/639,208

(22) PCT Filed: Jul. 23, 2020

(86) PCT No.: PCT/EP2020/025344
§ 371 (c)(1),
(2) Date: Feb. 28, 2022

(87) PCT Pub. No.: WO2021/037390
PCT Pub. Date: Mar. 4, 2021

(65) Prior Publication Data
US 2022/0402343 A1    Dec. 22, 2022

(30) Foreign Application Priority Data
Aug. 27, 2019   (DE) .......................... 102019006043.1

(51) Int. Cl.
*B60K 1/02*    (2006.01)
(52) U.S. Cl.
CPC ............ *B60K 1/02* (2013.01); *B60Y 2400/72* (2013.01); *B60Y 2400/73* (2013.01)

(58) Field of Classification Search
CPC ........ B60K 1/02; B60K 1/00; B60Y 2400/72; B60Y 2400/73
See application file for complete search history.

(56) References Cited

U.S. PATENT DOCUMENTS

| | | | |
|---|---|---|---|
| 5,643,119 | A | 7/1997 | Yamaguchi et al. |
| 6,383,106 | B1 | 5/2002 | Kashiwase |

(Continued)

FOREIGN PATENT DOCUMENTS

| | | |
|---|---|---|
| CN | 106560336 A | 4/2017 |
| DE | 69516129 T2 | 12/2000 |

(Continued)

OTHER PUBLICATIONS

International Report on Patentability issued in corresponding International Application No. PCT/EP2020/025344 dated Mar. 1, 2022, pp. 1-8, English Translation.

(Continued)

*Primary Examiner* — Justin Holmes
(74) *Attorney, Agent, or Firm* — CARTER, DELUCA & FARRELL LLP

(57) ABSTRACT

A drive includes a rotatably mounted planet carrier, planet gears, a ring gear having internal teeth and external teeth, a rotatably mounted sun gear, and a first gear wheel meshing with the external teeth of the ring gear. The first gear wheel is connected in a rotationally fixed manner to the rotor shaft of a first electric motor, the drive has a second gear wheel meshing with a toothed part, the second gear wheel is connected in a rotationally fixed manner to the rotor shaft of a second electric motor, and the toothed part is connected in a rotationally fixed manner to the sun gear.

20 Claims, 1 Drawing Sheet

(56) References Cited

U.S. PATENT DOCUMENTS

| | | | |
|---|---|---|---|
| 7,668,630 | B2 | 2/2010 | Weber et al. |
| 9,800,182 | B2 * | 10/2017 | Zhou ..................... B60L 50/51 |
| 11,005,332 | B2 | 5/2021 | Robertson |
| 2005/0119083 | A1 | 6/2005 | Lu et al. |
| 2012/0157255 | A1 | 6/2012 | Trindade |
| 2018/0065491 | A1 * | 3/2018 | King ..................... B60L 50/40 |
| 2018/0281596 | A1 * | 10/2018 | Arakawa .................. H02P 6/18 |

FOREIGN PATENT DOCUMENTS

| | | | | |
|---|---|---|---|---|
| DE | 10318696 | A1 | 11/2004 | |
| DE | 10333931 | A1 | 2/2005 | |
| DE | 69835174 | T2 | 6/2007 | |
| DE | 102019114810 | A1 | 12/2019 | |
| JP | 2013147188 | A * | 8/2013 | |
| WO | WO-2018088110 | A1 * | 5/2018 | ............. B60K 6/442 |

OTHER PUBLICATIONS

International Search Report issued in corresponding International Application No. PCT/EP2020/025344 dated Oct. 29, 2020, pp. 1-3, English Translation.

\* cited by examiner

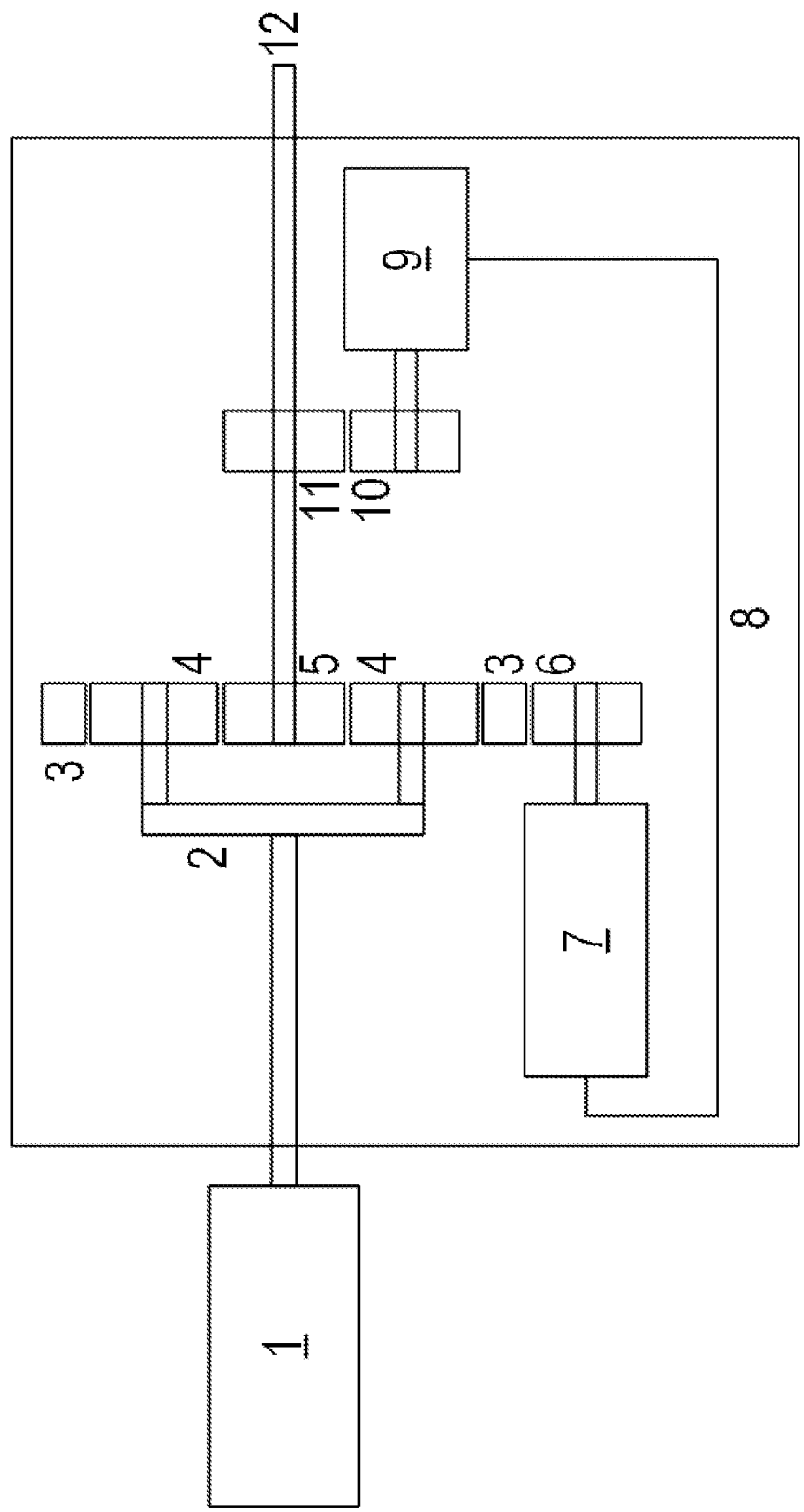

DRIVE AND METHOD FOR OPERATING A DRIVE

FIELD OF THE INVENTION

The invention relates to a drive and a method for operating a drive.

BACKGROUND INFORMATION

In certain conventional systems, a transmission has a transmission ratio. For example, a planetary gear has a high transmission ratio.

A hybrid transmission high-voltage connection is described in German Patent Document No. 10 2019 114 810.

A drive train with variable input speed and constant output speed is described in German Patent Document No. 103 18 696.

A hybrid vehicle is described in German Patent Document No. 695 16 129.

A control strategy for electromechanical power-split hybrid drives is described in German Patent Document No. 103 33 931.

A power transmission system for a hybrid vehicle is described in German Patent Document No. 698 35 174.

SUMMARY

Example embodiments of the present invention provide a drive, in which the transmission ratio is controllable.

According to an example embodiment of the present invention, a drive is provided for power transmission from a driving shaft, e.g., a planet carrier, to a driven shaft. A part of the power to be transmitted from the driving shaft is fed to a first electric motor operated as a generator and is converted into electrical power, which is at least partially fed to a second electric motor operated as a motor, the mechanical power of which is fed to the driven shaft. The first electric motor feeds an AC voltage side connection of a first inverter, whose DC voltage side connection feeds a DC voltage side connection of a second inverter, whose AC voltage side connection feeds the second electric motor. For example, the first electric motor has an electromagnetically actuated holding brake, the activation of which makes the part vanishingly small and the deactivation of which makes the part controllable by the inverter. The remaining portion of the power to be transmitted is transmitted from the driving shaft to the driven shaft via a mechanical transmission, e.g., a planetary gear.

The advantage is that when the holding brake is closed, no power is conducted via the electrical path. When the holding brake is open, however, it is possible to control the power conducted via the electrical path by appropriate activation of the inverter. For example, an overall transmission ratio of the drive is controllable, e.g., between zero and a value that is greater than the transmission ratio achievable through the solely mechanical path, e.g., via the transmission.

According to example embodiments, the drive has: a rotatably mounted planet carrier, e.g., which is connected to a drive shaft in a rotationally fixed manner; planet gears that are rotatably mounted on bolts connected to the planet carrier; a ring gear that has internal teeth and external teeth; a rotatably mounted sun gear; and a first gear, which meshes with the external teeth of the ring gear. The first gear is connected in a rotationally fixed manner to the rotor shaft of a first electric motor, e.g., a synchronous motor, a synchronous motor arranged as a three-phase motor, etc. The drive has a second gear which meshes with a toothed part, e.g., with a third gear wheel, and the second gear is connected in a rotationally fixed manner to the rotor shaft of a second electric motor, e.g., a synchronous motor, a synchronous motor designed as a three-phase motor, etc. The toothed part is connected in a rotationally fixed manner to the sun gear.

It is considered advantageous that a mechanical and an electrical power transmission path are arranged in parallel. This is because part of the power is conducted from the ring gear to the first electric motor, which is operated as a generator. The electrical power thus provided is fed to the driven shaft of the drive via the second electric motor. Thus, a power path mechanically transmitted by the planetary gear is connected in parallel to an electrical power path controllable by the inverter. In this manner, the power component that is conducted via the electrical path can also be used to control or regulate a transmission ratio, that is to say the quotient of the speed of the driven shaft and the speed of the planet carrier. If only the constant transmission ratio that can be generated by the mechanical path, i.e., the planetary gear, is desired, the drive is operable solely mechanically, e.g., like a planetary gear having fixed ring gear, by activating the brake of the first electric motor and by deactivating, e.g., activating the deenergized state, of the second electric motor. However, if a different transmission ratio is desired, this first electric motor is operable as a generator in regular operation by releasing the brake of the first electric motor and the generated power generated as a generator can be fed to the driven shaft in a controlled manner via the second electric motor in motor operation. Instead of a specific transmission ratio, however, a time-dependent curve, that is to say a time sequence of different transmission ratios, can also be specified.

According to example embodiments, the first electric motor is fed from the AC voltage side connection of a first inverter, whose DC voltage side connection is electrically connected, e.g., in parallel, to the DC voltage side connection of a second inverter, whose AC voltage side connection feeds the second electric motor. It is considered advantageous that the power to be consumed as a generator is controllable, e.g., in that the speed of the driving shaft, e.g., of the planet carrier, is controlled to a setpoint value and the associated torque is determined according to the power to be conducted through in the electrical path. This power is fed to the driven shaft in that such a torque is fed that the speed of the driven shaft is brought to the desired overall transmission ratio of the drive. Alternatively, however, this can also be carried out via a voltage controller.

According to example embodiments, the activation signals for the first inverter are generated by first signal electronics. It is considered advantageous that the first inverter determines the controlled operation of the first motor as a generator.

According to example embodiments, the activation signals for the second inverter are generated by second signal electronics. It is considered advantageous that the second inverter determines the controlled operation of the first motor as a generator. If an energy storage device is interposed between the first and second inverter, the generator and motor power do not have to be the same, but may differ from one another. Control deviations therefore do not cause the drive to oscillate. The control quality is therefore improved.

According to example embodiments, the first electronic signal system has a speed controller, e.g., a first linear controller, e.g., a P controller or PI controller, the manipulated variable of which is, for example, a generator torque of the first electric motor. It is considered advantageous that a simple implementation can be achieved.

According to example embodiments, the second signal electronics have a second linear controller, the manipulated variable of which is, for example, a motor torque of the second electric motor. It is advantageous here that a simple implementation can be achieved.

According to example embodiments, a first sensor for detecting the speed of the first gear wheel is connected to the first signal electronics, for example, and a sensor for detecting the voltage applied to the DC voltage side connection of the first inverter, and/or that a second sensor for detecting the speed of the second gear wheel is connected to the second signal electronics and a sensor for detecting the voltage applied to the DC voltage side connection of the second inverter. It is considered advantageous that the motors can be arranged as synchronous motors, each having a speed sensor.

According to example embodiments, a first sensor for detecting the output current at the AC voltage side connection of the first inverter is connected to the first signal electronics and/or that a second sensor for detecting the output current of the second inverter at the AC voltage side connection is connected to the second signal electronics. It is considered advantageous that the motor currents are detected.

According to example embodiments, the first signal electronics have a device for detecting the voltage applied at the DC voltage side connection of the first or second inverter. It is considered advantageous that the controllable semiconductor switches of the inverters can be operated with pulse width modulation, in which the pulse width is determinable as a function of the DC voltage available to the respective inverter. In this manner, when the intermediate circuit voltage fluctuates, a well-defined AC voltage can be generated at the AC voltage side connection of the second inverter.

According to example embodiments, an energy storage device is electrically connected in parallel to the DC voltage side connections of the first and the second inverter. It is considered advantageous that power fluctuations caused by control deviations can be buffered. If the energy storage device has a large capacity, it is possible to use different control strategies for the two inverters. For example, after starting, a smaller power flow can initially be fed by the motor to the driven shaft than from the first motor to the energy store. Thus, the speed can initially be accelerated more slowly than it would have to be accelerated with complete power transmission.

According to example embodiments, the energy storage device has an accumulator and/or a double-layer capacitor, e.g., an ultracap. It is considered advantageous that a large amount of buffer energy can be provided.

According to example embodiments, the first electric motor is arranged as a synchronous motor. It is considered advantageous that a high torque can be generated and/or an efficient generator operation can be achieved.

According to example embodiments, the second electric motor is arranged as a synchronous motor. It is considered advantageous that a high torque can be generated and/or an efficient motor operation can be achieved.

According to an example embodiment, in a method for operating a drive, the torque of the first electric motor, e.g., the motor current of the first electric motor, and the motor voltage of the first electric motor, is set such that the speed of the rotor shaft of the first electric motor is detected and controlled to a setpoint value, e.g., by the first inverter. The torque of the second electric motor, e.g., the motor current of the second electric motor, and the motor voltage of the second electric motor, is set such that the detected voltage applied to the DC voltage side connection of the second inverter is controlled to a setpoint value, e.g., by the second inverter.

It is considered advantageous that the generator-controlled motor attempts to increase the voltage and the motor-controlled motor attempts to lower the voltage, in which the voltage is additionally able to be limited in a simple manner.

According to example embodiments, the setpoint value is determined from the speed detected on the rotor shaft of the second electric motor, taking into consideration a specified transmission ratio and a specified split ratio. For example, the transmission ratio equals the desired value of the quotient of the speed of the sun gear shaft and the speed of the planet carrier or the desired value of the quotient of the speed of the rotor shaft of the second electric motor and the speed of the first electric motor. It is considered advantageous that the speed setpoint value of the first motor is determined from the actual value of the speed of the driven shaft and thus the transmission ratio desired for the electrical path is taken into consideration.

According to an example embodiment, in a method for operating a drive, the torque of the first electric motor, e.g., the motor current of the first electric motor, and the motor voltage of the first electric motor, is controlled such that the speed of the rotor shaft of the first electric motor is detected and controlled to a setpoint value, e.g., by the first inverter. The torque of the second electric motor, e.g., the motor current of the second electric motor, and the motor voltage of the second electric motor, is set such that the speed of the rotor shaft of the second electric motor is detected and controlled to a setpoint value, e.g., by the second inverter. The setpoint value is determined from the detected speed of the rotor shaft of the first electric motor, taking into consideration a specified transmission ratio and a specified split of the transmission ratio for the electrical and mechanical branch of the drive.

It is considered advantageous that the speed setpoint value of the first motor is directed to the actual speed of the driven shaft and both motors are operable with speed control, that is, they are operated using similar controller structures.

According to example embodiments, the transmission ratio of the drive is specified as a monotonically increasing function of the time and, when a target value is reached, the holding brake of the first motor is activated, e.g., the holding brake is thus applied. The transmission ratio of the drive with fixed ring gear is equal to the target value. It is considered advantageous that the brake is released to start the drive and the ring gear is thus rotatable. In addition, when starting, not only the speed of the output shaft is increased, but also the transmission ratio of the drive from a low value, for example zero, to the target value, which is equal to the transmission ratio of the solely mechanical path, e.g., of the transmission.

Further features and aspects of example embodiments of the present invention are explained in more detail below with reference to the appended schematic FIGURE.

BRIEF DESCRIPTION OF THE DRAWINGS

FIG. 1 schematically illustrates a drive according to an example embodiment of the present invention.

DETAILED DESCRIPTION

A drive according to an example embodiment of the present invention is schematically illustrated in FIG. 1.

As illustrated in FIG. 1, a torque source 1, e.g., an electric motor, drives a rotatably mounted planet carrier 2 of the drive.

Bolts aligned in parallel to the axis of rotation of the planet carrier 2 are connected to the planet carrier 2, on which planet gears 4 are rotatably mounted, e.g., via needle bearings or other roller bearings.

The planet gears 4, which are, for example, evenly spaced apart from one another in the circumferential direction, are meshed on the one hand with a centrally arranged sun gear 5 and on the other hand with a rotatably mounted ring gear 3 that radially surrounds the planet gears 4.

The ring gear 3 not only has internal teeth that mesh with the external teeth of the planet gears 4, wherein the external teeth of the planet gears 4 mesh with the external teeth of the sun gear 5, but the ring gear 3 also has external teeth that mesh with the external teeth of a first gear wheel 6.

This first gear wheel 6 is rotatably mounted and connected in a rotationally fixed manner to the rotor shaft of a first electric motor, e.g., a synchronous motor, which can be fed by an inverter 7. When operating as a generator, torque is thus transmitted from the ring gear 3 to the first gear wheel 6 and, depending on the speed of the first gear 6, electrical power is conducted from the first electric motor to the inverter.

The AC voltage side connection of the inverter 7 is connected to the connection of the electric motor, e.g., to the stator of the first electric motor.

The DC voltage side connection of the inverter 7 is connected to the DC voltage side connection of a second inverter 9, whose AC voltage side connection is connected to the connection of a second electric motor, e.g., a synchronous motor. This second electric motor drives, e.g., directly, a second gear wheel 10, which meshes with a toothed part 11, e.g., a third gear wheel, which is connected in a rotationally fixed manner to that shaft 12 which is connected in a rotationally fixed manner to the sun gear 5, e.g., to the output shaft of the planetary gear. Thus, the sun gear 5 is connected to the toothed part 11 in a rotationally fixed manner.

The connection of the DC voltage side connections of the two inverters (7, 9) can be referred to as an intermediate circuit 8, wherein an upper potential of this DC voltage and a lower potential of this DC voltage, that is to say an intermediate circuit voltage, is provided.

Optionally, an energy storage device can be added to this intermediate circuit 8, so that an amount of energy generated as a generator is storable in the energy storage device, e.g., usable as buffer energy.

The first inverter 7 has a device for detecting the motor current, that is to say the output current to the first electric motor, the rotor shaft of which is connected in a rotationally fixed manner to the first gear wheel 6.

A transmission ratio is specified for operating the drive. To achieve this, the first inverter is operated in speed control. The detected speed n1_Ist of the first gear wheel 6 is controlled to a target value n1_Soll in that a torque M1 is set. The torque is generated as a generator, so it has a negative value.

The actual value U_z_Ist of the intermediate circuit voltage is detected and controlled to a setpoint value U_z_Soll by the second inverter 9, in that a torque M2 is introduced via the second motor to the second gear wheel 10 as a manipulated variable.

The setpoint value U_z_Soll is specified as low as possible, for example, 100 volts.

The power supplied as a generator attempts to increase the intermediate circuit voltage, which is limited to a maximum value U_z_max, however, for example, to 650 volts or a value between 650 volts and 800 volts.

Thus, the first inverter 7 tends to increase the intermediate circuit voltage and the second inverter 9 tends to decrease the intermediate circuit voltage. In the ideal case, the intermediate circuit voltage initially remains at a moderate value, wherein the intermediate circuit voltage reaches a negligibly small value, e.g., zero, after the brake of the first electric motor has been activated, e.g., applied.

By providing a capacitance in the intermediate circuit 8, e.g., by providing an energy storage device in the intermediate circuit 8, control fluctuations of the first inverter 7 influence the control behavior of the second inverter less and the tendency of the entire system to oscillate is reduced.

The speed controller of the first inverter 7 is, for example, arranged as a linear controller, such as a P controller or PI controller. The controller of the second inverter 9 is, for example, also arranged as a linear controller, such as a P controller or PI controller.

Thus, only one speed detection on the first electric motor and one detection of the intermediate circuit voltage as well as the detection of the output currents of the two inverters (7, 9) at their respective AC voltage side connection is necessary. In addition, it is helpful to detect the speed of the second electric motor in order to generate a rotating field that is as well adapted as possible.

The first electric motor is, for example, arranged as a three-phase motor, and the second electric motor is also.

The respective inverter (7, 9) has a parallel circuit of three series circuits fed from the intermediate circuit voltage, wherein each of the series circuits has two controllable semiconductor switches, e.g., IGBT or MOSFET, connected in series. In this manner, a three-phase voltage can be provided at the at the AC voltage side connection of the respective inverter.

The control voltages for the semiconductor switches are generated by signal electronics, which are, for example, composed of a first part, which is arranged in a housing with the first inverter 7, and a second part, which is arranged in a housing with the second inverter 9. The two parts are connected by a data exchange connection. The first part contains the speed controller and the second part contains the voltage controller, wherein both controllers each have a torque as a manipulated variable.

The sun gear 5 is arranged radially inside the planet gears 4, which in turn are arranged radially inside the ring gear 3.

In further exemplary embodiments, a different controller structure is used. Both inverters 7 and 9 are each operated in speed control and specify a desired transmission ratio for the electrical branch. The speed n1_ist detected on the first electric motor is controlled to a specified setpoint speed curve n1_Soll (t), in that a torque M1 is set and thus fed to the first gear wheel 6 via the first electric motor. The second inverter receives a value dependent on the detected speed n1_ist as setpoint speed n2 and controls the detected speed n2_ist of the toothed part 11 to this setpoint speed n2, in that it sets a corresponding torque M2. The setpoint speed is, for example, determined as the sum of the speed of the planet carrier 2, which is multiplied by the mechanical transmission ratio and detected by a speed sensor, and the speed additionally generated via the electrical path.

In further exemplary embodiments, instead of a constant value for the transmission ratio, e.g., a gear ratio, a time curve of the transmission ratio is specified. For example, to start a drive, during the acceleration starting from the speed zero until reaching the setpoint speed, the transmission ratio increases from zero to a value which corresponds to the solely mechanical transmission ratio of the planetary gear, e.g., that transmission ratio which is achieved with activated brake of the first motor, e.g., fixing of the ring gear 3, when the second motor is deactivated. The brake is therefore only activated and the ring gear 3 is only fixed when the transmission ratio has reached the value that can be achieved solely mechanically by the planetary gear.

LIST OF REFERENCE NUMERALS

| | |
|---|---|
| 1 | torque source, e.g., electric motor |
| 2 | planet carriers |
| 3 | ring gear |
| 4 | planet gear |
| 5 | sun gear |
| 6 | first gear wheel |
| 7 | inverters, e.g., inverters operated as generators |
| 8 | intermediate circuit |
| 9 | inverters, e.g., inverters operated as motors |
| 10 | second gear wheel |
| 11 | toothed part, e.g., third gear wheel |
| 12 | shaft, e.g., output shaft |

The invention claimed is:

1. A drive for power transmission from a driving shaft to a driven shaft, comprising:
   a first electric motor;
   a second electric motor;
   a mechanical transmission;
   a first inverter; and
   a second inverter;
   wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft; and
   wherein the mechanical transmission includes a planetary gear, and the driving shaft includes a planet carrier.

2. The drive according to claim 1, wherein the first electric motor is fed from the AC voltage side connection of the first inverter, the DC voltage side connection of the first inverter being electrically connected to the DC voltage side connection of the second inverter, the AC voltage side connection of the second inverter feeding the second electric motor.

3. The drive according to claim 1, further comprising first signal electronics adapted to generate activation signals for the first inverter and second signal electronics adapted to generate activation signals for the second inverter.

4. The drive according to claim 1, wherein an energy storage device is electrically connected in parallel to the DC voltage side connections of the first inverter and the second inverter.

5. The drive according to claim 4, wherein the energy storage device includes an accumulator, a double-layer capacitor, and/or an ultracap.

6. The drive according to claim 1, wherein the first electric motor and/or the second electric motor is arranged as a synchronous motor.

7. A method for operating a drive as recited in claim 1, comprising:
   setting a torque of the first electric motor to detect and control a speed of a rotor shaft of the first electric motor to a first setpoint value; and
   setting a torque of the second electric motor by controlling a detected voltage applied to the DC voltage side connection of the second inverter to a second setpoint value.

8. The method according to claim 7, wherein the setting of the torque of the first electric motor includes setting a motor current of the first electric motor and/or setting a motor voltage of the first electric motor to control and control the speed of the rotor shaft of the first electric motor to the first setpoint value by the first inverter, the setting of the torque of the second electric motor including setting a motor current of the second electric motor and/or a motor voltage of the second electric motor by controlling the detected voltage applied to the DC voltage side connection of the second inverter to the second setpoint value by the second inverter.

9. The method according to claim 7, wherein the first setpoint value is determined from a speed detected on a rotor shaft of the second electric motor, taking into consideration a specified transmission ratio and a specified split ratio.

10. The method according to claim 9, wherein the transmission ratio equals a desired value of a quotient of a speed of the sun gear shaft and a speed of the planet carrier or a desired value of a quotient of the speed of the rotor shaft of the second electric motor and the speed of the first electric motor.

11. A method for operating a drive as recited in claim 1, comprising:
   setting a torque of the first electric motor to detect and control a speed of a rotor shaft of the first electric motor to a first setpoint value;
   setting a torque of the second electric motor to detect and control a speed of a first shaft of the second electric motor to a second setpoint value; and
   determining the second setpoint value from the detected speed of the rotor shaft of the first electric motor, taking into account a specified transmission ratio and a specified split of the transmission ratio for electrical and mechanical branches of the drive.

12. The method according to claim 11, wherein the setting of the torque of the first electric motor includes setting a motor current of the first electric motor and/or a motor voltage of the first electric motor to detect and control the speed of the rotor shaft of the first electric motor to the first setpoint value by the first inverter, the setting of the torque of the second electric motor including setting a motor current and/or a motor voltage of the second electric motor to detect and control the speed of the rotor shaft of the second electric motor by the second inverter.

13. The method according to claim 11, wherein the transmission ratio of the drive is specified as a monotonically increasing function of a time and, when a target value is reached, a holding brake of the first motor is activated and/or applied, and wherein the transmission ratio of the drive with a fixed ring gear is equal to a target value.

14. A drive for power transmission from a driving shaft to a driven shaft, comprising:
   a first electric motor;
   a second electric motor;

a mechanical transmission;
a first inverter; and
a second inverter;
wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft; and
wherein the first electric motor includes an electromagnetically actuated holding brake, activation of the holding brake making the part vanishingly small and deactivation of the brake making the part controllable by at least one of the first inverter and the second inverter.

15. A drive for power transmission from a driving shaft to a driven shaft, comprising:
a first electric motor;
a second electric motor;
a mechanical transmission;
a first inverter;
a second inverter; and
a rotatably mounted planet carrier, planet gears rotatably mounted on bolts connected to the planet carrier, a ring gear having internal teeth and external teeth, a rotatably mounted sun gear, and a first gear wheel meshing with the external teeth of the ring gear, the first gear connected in a rotationally fixed manner to a rotor shaft of the first electric motor, the drive including a second gear wheel meshing with a toothed part, the second gear connected in a rotationally fixed manner to a rotor shaft of the second electric motor, the toothed part connected in a rotationally fixed manner to the sun gear;
wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft.

16. The drive according to claim 15, wherein the planet carrier is connected to a drive shaft in a rotationally fixed manner, the first electric motor is arranged as a synchronous motor and/or a three-phase motor, the second electric motor is arranged as a synchronous motor and/or a three-phase motor, the toothed part includes a third gear wheel.

17. A drive for power transmission from a driving shaft to a driven shaft, comprising:
a first electric motor;
a second electric motor;
a mechanical transmission;
a first inverter;
a second inverter;
first signal electronics adapted to generate activation signals for the first inverter; and
second signal electronics adapted to generate activation signals for the second inverter;
wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft; and
wherein the first signal electronics include a controller arranged as a speed controller, a first linear controller, a P controller, and/or PI controller, and wherein a manipulated variable of the controller is a generator torque of the first electric motor.

18. The drive according to claim 17, wherein the second signal electronics include a second linear controller, and wherein a manipulated variable of the second linear controller is a motor torque of the second electric motor.

19. A drive for power transmission from a driving shaft to a driven shaft, comprising:
a first electric motor;
a second electric motor;
a mechanical transmission;
a first inverter;
a second inverter;
first signal electronics adapted to generate activation signals for the first inverter; and
second signal electronics adapted to generate activation signals for the second inverter;
wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft; and
wherein (a) a first sensor adapted to detect a speed of a first gear wheel is connected to the first signal electronics and/or a sensor adapted to detect a voltage applied to the DC voltage side connection of the first inverter, and/or (b) a second sensor adapted to detect a speed of the second gear wheel is connected to the second signal electronics and a sensor adapted to detect a voltage applied to the DC voltage side connection of the second inverter.

20. A drive for power transmission from a driving shaft to a driven shaft, comprising:
- a first electric motor;
- a second electric motor;
- a mechanical transmission;
- a first inverter;
- a second inverter;
- first signal electronics adapted to generate activation signals for the first inverter; and
- second signal electronics adapted to generate activation signals for the second inverter;
- wherein the first electric motor is adapted to operate as a generator, to be fed by a part of power to be transmitted from the driving shaft, and to convert the part of the power into electrical power that is at least partially fed to the second electric motor operated as a motor and adapted to feed mechanical power to the driven shaft, the first electric motor adapted to feed an AC voltage side connection of the first inverter, a DC voltage side connection of the first inverter adapted to feed a DC voltage side connection of the second inverter, an AC voltage side connection of the second inverter adapted to feed the second electric motor, the mechanical transmission adapted to transmit a remaining portion of the power to be transmitted from the driving shaft to the driven shaft; and
- wherein a first sensor adapted to detect an output current at the AC voltage side connection of the first inverter is connected to the first signal electronics, and/or a second sensor adapted to detect an output current of the second inverter at the AC voltage side connection is connected to the second signal electronics.

* * * * *